US008683782B2

(12) United States Patent
Op De Beeck et al.

(10) Patent No.: US 8,683,782 B2
(45) Date of Patent: Apr. 1, 2014

(54) SYSTEM FOR SUPPLYING A LIQUID FOR A VEHICLE AND INTEGRATED PUMP/FILTER MODULE

(75) Inventors: Joel Op De Beeck, Lint (BE); Julien Conesa, Paris (FR); Laurent Budzyk, Mazinghien (FR)

(73) Assignee: Inergy Automotive Systems Research, Brussels (BE)

( * ) Notice: Subject to any disclaimer, the term of this patent is extended or adjusted under 35 U.S.C. 154(b) by 671 days.

(21) Appl. No.: 12/667,922

(22) PCT Filed: Jul. 9, 2008

(86) PCT No.: PCT/EP2008/058943
§ 371 (c)(1),
(2), (4) Date: Jan. 6, 2010

(87) PCT Pub. No.: WO2009/007405
PCT Pub. Date: Jan. 15, 2009

(65) Prior Publication Data
US 2010/0175369 A1   Jul. 15, 2010

(30) Foreign Application Priority Data

Jul. 10, 2007   (FR) ..................................... 07 56388

(51) Int. Cl.
*F01N 3/00* (2006.01)
*F04B 23/00* (2006.01)
*F04B 17/00* (2006.01)
*F04B 35/04* (2006.01)

(52) U.S. Cl.
USPC ........................... 60/286; 417/313; 417/410.1

(58) Field of Classification Search
USPC ........ 417/313, 326, 441, 410.1, 410.4, 423.9, 417/424.2; 60/286, 287, 295; 418/85, 96
See application file for complete search history.

(56) References Cited

U.S. PATENT DOCUMENTS 4,457,679 A * 7/1984 Warnecke et al. .............. 418/91
4,626,178 A * 12/1986 Terumoto ...................... 417/366

(Continued)

FOREIGN PATENT DOCUMENTS

DE        4444854 A1    6/1996
EP        1619382 A2    1/2006

(Continued)

OTHER PUBLICATIONS

U.S. Appl. No. 12/677,632, filed Mar. 11, 2010, Joël Op De Beeck et al.

(Continued)

*Primary Examiner* — Thomas Denion
*Assistant Examiner* — Jason Sheppard
(74) *Attorney, Agent, or Firm* — Oblon, Spivak, McClelland, Maier & Neustadt, L.L.P.

(57) ABSTRACT

Supply system for a liquid comprising a liquid tank, a supply line, a pump, a filter and a device that makes it possible to purge the line, pump and filter and that comprises a non-return device preventing liquid from entering into these elements once they have been purged. In this system, the pump, filter and non-return device are combined in a compact module, the filter at least partly surrounding the pump and the non-return device being an integral part of a common housing that surrounds the filter and at least one part of the pump.

9 Claims, 2 Drawing Sheets

(56) References Cited

U.S. PATENT DOCUMENTS

Figure 1:
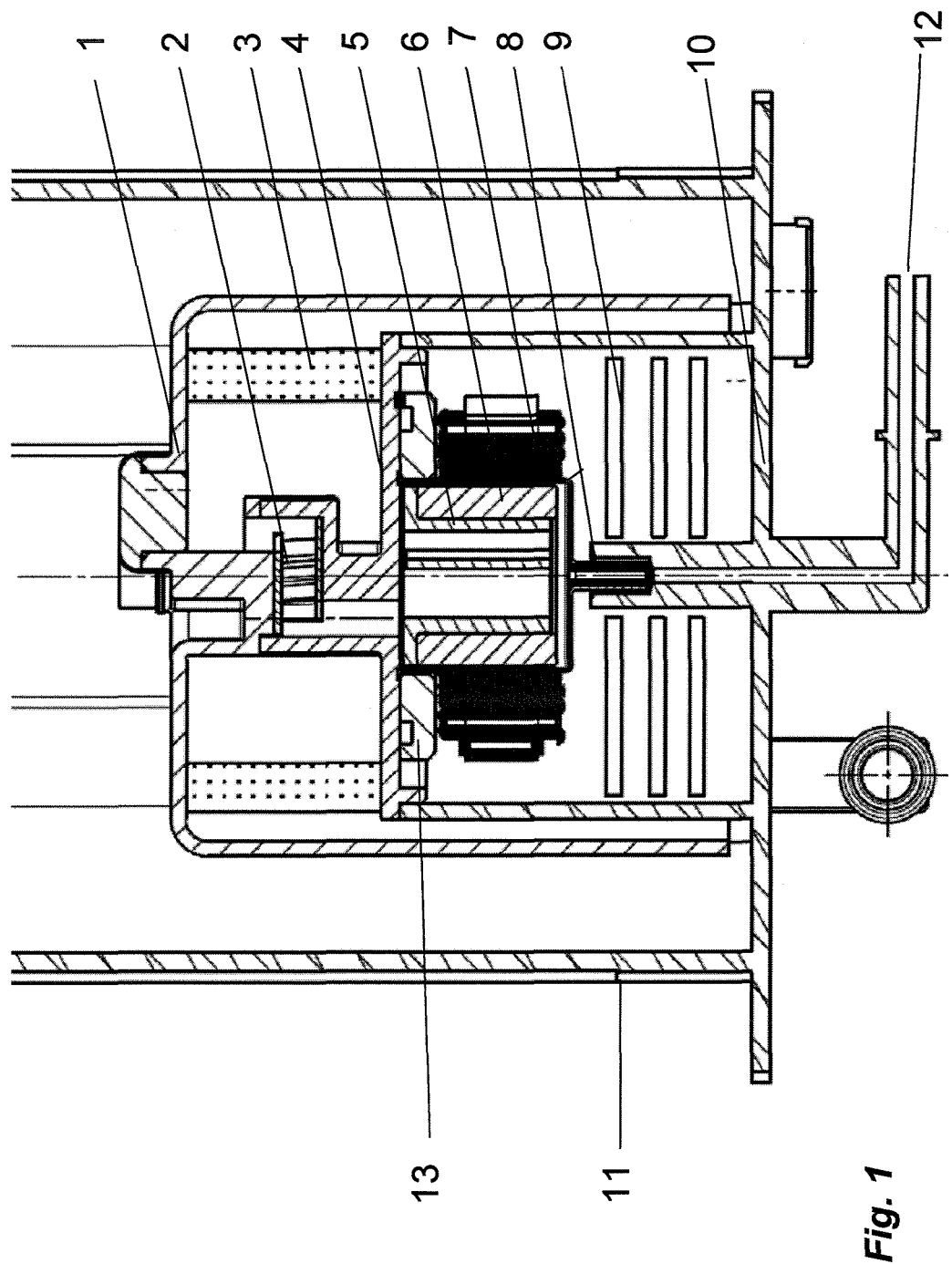

| | | | |
|---|---|---|---|
| 5,156,535 A * | 10/1992 | Budris et al. | 417/423.7 |
| 5,219,277 A * | 6/1993 | Tuckey | 417/366 |
| 5,392,750 A | 2/1995 | Laue et al. | |
| 5,601,422 A * | 2/1997 | Treiber et al. | 418/15 |
| 5,908,020 A | 6/1999 | Boutwell et al. | |
| 6,036,456 A * | 3/2000 | Peters et al. | 417/423.3 |
| 6,293,770 B1 | 9/2001 | Matsumoto et al. | |
| 6,884,043 B2 * | 4/2005 | Kimberlin et al. | 417/355 |
| 2007/0113830 A1* | 5/2007 | Koito et al. | 123/509 |
| 2009/0101656 A1* | 4/2009 | Leonard | 220/562 |
| 2009/0230136 A1 | 9/2009 | Dougnier et al. | |

FOREIGN PATENT DOCUMENTS

| | | |
|---|---|---|
| EP | 1785619 A1 | 5/2007 |
| FR | 2916188 A1 | 11/2008 |
| GB | 2304821 A | 3/1997 |
| JP | 20040138004 A | 5/2004 |
| WO | WO 2006064028 A1 | 6/2006 |
| WO | WO 2006127137 A1 | 11/2006 |
| WO | WO 2007141312 A1 | 12/2007 |
| WO | WO 2008138960 A1 | 11/2008 |
| WO | WO 2009037340 A1 | 3/2009 |

OTHER PUBLICATIONS

Unknown Author, Euro 4 : Commission Directive 2003/76/EC of Aug. 11, 2003 amending Council Directive 70/220/EEC relating to measures to be taken against air pollution by emissions from motor vehicles, 2 pgs.

* cited by examiner

SYSTEM FOR SUPPLYING A LIQUID FOR A VEHICLE AND INTEGRATED PUMP/FILTER MODULE

CROSS-REFERENCE TO RELATED APPLICATIONS

This application is a U.S. national stage application under 35 U.S.C. §371 of International Application No. PCT/EP2008/058943 filed Jul. 9, 2008, which claims priority to French Patent Application No. 0756388 filed Jul. 10, 2007, these applications being incorporated herein by reference in their entirety for all purposes.

The present invention relates to a system for supplying a liquid for a vehicle and also an integrated pump/filter module suitable for said system.

With the Euro IV standard on exhaust emissions from heavy goods vehicles coming into effect in 2005, devices for pollution control of NOx (or nitrogen oxides) have had to be put in place.

The system used by most heavy goods vehicle manufacturers for reducing NOx emissions to the required value consists in carrying out a selective catalytic reaction with reducing agents such as urea ("Urea SCR" or selective catalytic reduction using ammonia generated in situ in the exhaust gases by decomposition of urea).

In order to do this it is necessary to equip the vehicles with a tank containing a urea solution, a device for metering the amount of urea to be injected into the exhaust line and a device for supplying urea solution to the device for metering the amount of urea to be injected. In general, the supply device comprises a supply line, a pump and a filter which are generally separate elements that may or may not be integrated into a common mounting plate or base plate, which is preferably submerged. In case of freezing, it is advantageous to be able to purge the supply line (and also the pump, filter, etc. and all the components located over this line) in order to prevent damage following the formation of ice.

Thus, Application WO 2006/064028 in the name of the Applicant describes a urea supply system designed to be able to purge the supply line completely and in one step in case of freezing below a given temperature and/or each time the engine stops. However, to prevent the purged elements from again being filled with liquid when the pump is stopped once the purge has been carried out, it is preferable to equip the suction site (branch) on the tank with a non-return device.

Application PCT/EP2007/055613 also in the name of the Applicant proposes a solution to this problem by equipping said branch with a bell/siphon combination that prevents liquid being transferred from the tank to the purged elements. However, in the system described in this application, the filter, the pump and the bell/siphon are separate elements, which are, it is true, integrated into a common base plate submerged in the tank, but the size of which is however large.

The present invention aims to solve this problem by providing a compact pump/filter module capable both of feeding a line for supplying a liquid to a vehicle and of purging said line while keeping the purged line free of liquid.

For this purpose, the present invention relates to a supply system for a liquid comprising a liquid tank, a supply line, a pump, a filter and a device that makes it possible to purge the line, pump and filter and that comprises a non-return device preventing liquid from entering into these elements once they have been purged. In this system, the pump, filter and non-return device are combined in a compact module, the filter at least partly surrounding the pump and the non-return device being an integral part of a common housing that surrounds the filter and at least one part of the pump.

The liquid in which is concerned by the present invention is preferably a compound that is liquid under normal usage conditions and that plays an active role in a motor vehicle, heavy goods vehicle, etc. This liquid may be used namely for cleaning, lubrication, braking, suspension, cooling or pollution control. In one particularly appropriate embodiment, the invention is used in the context of the pollution control of vehicle exhaust gases. In this case, the fluid may be, for example, an additive used for the regeneration of a particulate filter (PF) or may be injected into the exhaust gases to reduce the $NO_x$ content thereof.

In the case of a PF additive, this is generally a composition, in solution in a hydrocarbon-based solvent, of a catalyst for low-temperature combustion of solid carbonated particulates produced by the incomplete combustion of a heavy hydrocarbon in a compression-ignition engine. The expression "heavy hydrocarbon" is understood to mean a fuel that is liquid or pasty at ambient temperature, the molecules of which comprise more than 9 carbon atoms. An example of such a heavy hydrocarbon is an oil cut known as gas oil that can be used in diesel type engines. Examples of suitable liquid additives are iron and cerium salts in hydrocarbon-based solution. In particular, the solutions available under the tradename EOLYS® are especially suitable for PFs.

However, the present invention applies particularly well to a reducing agent capable of reducing the NO present in the exhaust gases of the vehicle's engine. It is advantageously an ammonia precursor in aqueous solution. The invention gives good results with aqueous solutions of urea and in particular, eutectic solutions of urea with water such as solutions of AdBlue®, the urea content of which is between 31.8 and 33.2 wt % and which contain around 18% of ammonia. The invention may also be applied to urea/ammonium formate mixtures in aqueous solution, sold under the trademark Denoxium® and which contain around 13% of ammonia. The latter have the advantage, with respect to urea, of only freezing from and below −35° C. (as opposed to −11° C.), but have the disadvantages of corrosion problems linked to the release of formic acid.

The system according to the invention comprises at least one tank intended for storing the additive. This tank may be made from any material, preferably one that is chemically resistant to the additive in question. In general, this is metal or plastic. In the case of urea, polyolefin resins, in particular polyethylene (and more particularly HDPE or high-density polyethylene), constitute preferred materials.

Preferably, as mentioned above and as described in the aforementioned Application PCT/EP2007/055613 (the content of which is incorporated by reference in the present application), the tank is equipped with a base plate or mounting plate which is a flattened part (i.e. the thickness of which part is smaller than its length or diameter) intended to block off an opening in its lower wall. It should be noted that this part may be hollow and define an enclosure which communicates with the tank via an orifice through which the additive can flow. It generally has a perimeter, closed up on itself, of any shape. Usually, its perimeter has a circular shape.

Preferably, this base plate integrates the pump/filter/non-return device module according to the invention. This is understood to mean that this module is either attached to this base plate or produced at least partly from one piece with this base plate.

Preferably, the base plate integrates several active storage and/or metering components and, most particularly preferably, it integrates all the active components which are brought to be in contact with the liquid additive found in, leaving from or arriving into the additive tank.

Most preferably, it also integrates (by being moulded from one piece with it, preferably by injection-moulding of a plastic) a tube that makes it possible to connect thereto the supply line of the system according to the invention. Preferably, this tube and/or line are equipped with complementary reliefs that enable them to be assembled rapidly by a rapid connection of the "snap fit" or "quick connect" type, well known to a person skilled in the art. Generally the supply line is also made of plastic (for example, based on polyamide PA-6,6) and it may be equipped with a heating element (for example, a heating filament wound around its surface then covered with rubber).

In this variant (module integrated into a submerged base plate), it is advantageous that said module is located inside a (sealed or unsealed) volume, inside of which, preferably, at least one part of a heating element is attached. Most particularly preferably, this volume is sealed, that is to say is delimited by a substantially solid side wall that acts as a trap for the fluid (ensuring a minimum volume of liquid under all usage conditions). The term "substantially solid" is understood to mean that this wall may comprise orifices, but these are then in its upper part so that the volume is able to trap liquid (urea) in its lower part. In this variant, the trap may either be made from one piece with the base plate or be attached to this base plate, the first alternative being preferred. Most preferably, the heating element is a flexible heater (resistive track inserted between two flexible films or affixed to a flexible film) as described in Application FR 0755118 in the name of the Applicant, the content of which is, for this purpose, incorporated by reference in the present application.

In the context of the invention, the pump is preferably a rotary pump of any known type, preferably driven by a magnetically-coupled motor and the control of which is preferably electronic (managed by an ECM or Electronic Control Module).

A pump which is particularly well suited and which is the subject of a co-pending application in the name of the Applicant, consists of a rotary pump comprising a rotation axle attached both to a mechanical pumping element and to a magnetized rotor, this rotor comprising at least one recess through which the fluid sucked up by the mechanical pumping element is forced.

Preferably, the pumping element consists of at least two gears (toothed wheels) which make it possible, by rotation, to pump over and increase the pressure of the fluid.

Also, preferably, all the liquid sucked up by the pump is subjected successively to the action of the mechanical element and of the magnetic rotor, either in this order or in the reverse order. Preferably, the fluid is first sucked up by the mechanical element and is then forced through the recess of the rotor, the rotation of which imparts a helical movement (trajectory) to it, combined with a certain acceleration. This effect can be reached through an adequate geometry of the recess, as the one illustrated in the figures attached to the present application.

A magnetic field is generally applied to the rotor of such a pump by means of a stator comprising one or more magnetic coils. In one variant that is preferred (in terms of coupling efficiency), the coils of the stator are in direct contact with the rotor (with interposition of its housing, where appropriate).

The electric power supply for these coils is preferably controlled electronically, as explained previously. Hence, the pump according to this variant of the invention also preferably comprises one or more printed circuit boards (electronic cards).

The cards and/or the stator may or may not be integrated into the compact module according to the invention and therefore may or may not be contained in the common housing. Preferably, they are.

According to the invention, a filter partly surrounds the pump. Preferably, the pump sucks up through this filter so that it is protected from impurities. This filter may be of any known type. A simple accordion-pleated filter paper gives good results. Preferably, in the preferred variant explained above, the filter surrounds at least the mechanical pumping element.

In this variant, the filter and the mechanical element may be located in the lower part of the pump and be overhung by the rotor, the whole assembly being surrounded by a cover which is the common housing according to this variant of the invention and which is itself overhung by the stator and the electronic cards surrounded by an upper sealed enclosure.

However, preferably, the common housing of the module according to the invention comprises a cover and a lower part and:
  the lower part consists of a sealed enclosure which comprises the rotor, the stator and the electronic cards, and on which the filter rests; and
  the cover surrounds the filter and the mechanical element and is attached via a screw and nut connection to the sealed enclosure.

The system according to the invention also comprises a device that makes it possible to purge the line, pump and filter. This purge may take place as described in the aforementioned Application WO 2006/064028, i.e. using compressed air or by sucking the exhaust gases or air through an injector either by using a 4-way valve or by reversing the rotational direction of the pump. The latter variant is preferred (as it does not require a supplementary component in the system) and is particularly well suited for the aforementioned type of pump (having gears and with magnetic drive).

Finally, the system according to the invention comprises a non-return device that prevents liquid from entering into the purged elements once the pump has been stopped. This device is integrated into the common housing, i.e. it is either attached to this housing, or moulded from one and the same piece with it and/or is part of its geometry. The variant according to which the non-return device is moulded from one and the same piece with the housing, or in other words: according to which the housing has (at least partly) a geometry such that it acts as a non-return device, is preferred. This device is preferably placed at the point for sucking up the liquid in the tank.

This device must of course allow the supplying of liquid to the supply line, i.e. it is not strictly speaking a non-return device since it must allow the flow of liquid from the tank to the purged elements when the pump operates/starts in "supply" mode. Hence, particularly advantageously, this device comprises a siphon part (and most particularly preferably: a bell/siphon combination as mentioned previously) of geometry such that once the elements (line, pump and filter) have been purged and filled with gas, this siphon part only allows the flow of liquid from the tank to the elements when the pump is started in "supply" mode (i.e. in order to generate a vacuum at the suction point in the tank and a pressure at its outlet).

In the case where the pump is submerged in the liquid to be pumped, it is sufficient to ensure that the aforementioned cover has the shape of a bell which does not extend (at least not completely) to the bottom of the tank and is not placed too close to the enclosure and/or the filter. Most preferably, the bell and the enclosure/filter are positioned so as to create a path for the fluid such that, when the pump is in "forward"

drive (in order to supply the fluid), the fluid is sucked up underneath the bell through an annular cavity between the inner surface of the bell and the outer surface of the enclosure/filter, to finally be sucked up through this filter by the mechanical pumping element.

In other words: the bell preferably has at least one opening in its lower part (which is preferably an annular opening that occupies its entire lower circumference, which means to say that the bell rests on the filter in fact and not on the bottom of the tank) and it is positioned so as to create an annular cavity between its inner surface and the outer surface of the enclosure/filter where the liquid can be sucked up through the filter via the lower opening of the bell.

In this variant, when the pump is rotated in the reverse direction (i.e. operates in purge mode), then is stopped, a pocket of air will be formed around the filter which will keep the latter dry until the pump is restarted, which will hence be quicker in the case of freezing (since the formation of a plug of ice in the filter will thus have definitely been prevented).

The present invention also relates to a compact module suitable for a system such as described above and comprising a pump, a filter at least partly surrounding the pump and a non-return device being an integral part of a common housing that surrounds the filter and at least one part of the pump.

Preferably, this module is integrated into a base plate submerged in a liquid tank such as described previously.

Hence, the present invention also relates to a liquid tank comprising a submerged base plate that integrates a module such as described previously and of which the common housing comprises a cover and a lower part which are such that:
the lower part consists of a sealed enclosure which comprises a substantially cylindrical wall equipped with a base and moulded from one part with the base plate and also a cover assembled in a sealed manner with this cylindrical wall, on which the filter rests and through which the rotation axle is inserted in a sealed manner; and
the cover surrounds the filter and the mechanical element and is attached via a screw and nut connection to the sealed enclosure.

In this variant, the base plate is preferably based on an injection-moulded plastic. An injection-moulded base plate based on pure (not reinforced) polyamide PA-6,6 gives good results. The bell is preferably also based on an injection-moulded plastic and most particularly preferably, based on a material with low water adsorption such as a PPA (polyphthalamide) or a PPS (polyphenylene sulphide).

Figure 2:
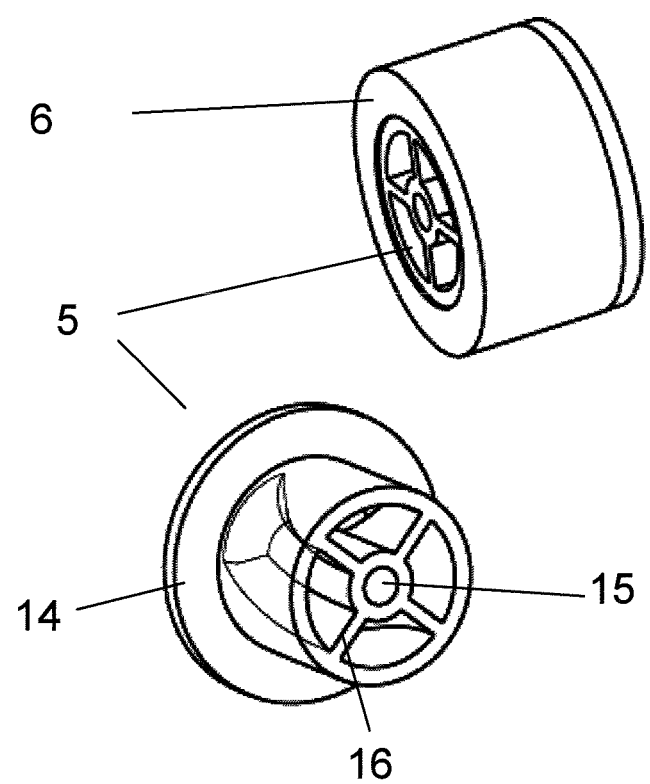

The present invention is illustrated, non-limitingly, by FIGS. 1 and 2.

FIG. 1 consists of a cut through a plane parallel to the rotation axle in a pump according to one advantageous variant of the invention and intended to inject a urea solution into the exhaust gases of a diesel vehicle.

FIG. 2 consists of a detail of certain elements illustrated in FIG. 1 (in particular of the rotor (6) and of its support (5)).

In these figures, identical numbers denote identical components.

The pump which is illustrated in FIG. 1 comprises a bell-shaped cover (1) surrounding a gear system (2) itself surrounded by a filter (3).

It also comprises a lower sealed enclosure (4) made up of a cover and a cylindrical wall equipped with a base and moulded from one part with a base plate (10) submerged in a urea tank (not represented). This base plate also comprises a urea trap (11) moulded from one part with it, and also a tube (12), also moulded from one part with it and intended to be connected to a line for supplying urea to the exhaust gases of an engine (components that are not represented).

The lower enclosure (4) comprises a magnetized rotor made up of a magnet (6) equipped with an internal support (5) and being contained in a housing (8) that comprises a hollow shaft inserted, in a leaktight manner, into the tube (12). This housing is attached to the cover of the enclosure (4) by an annular attachment part (13) and it is surrounded by magnetic coils (7). Operation of the pump is managed by a controller comprising electronic cards (9) also contained in the sealed enclosure (4).

The geometry of the magnet (6) and of its support (5) is illustrated in detail in FIG. 2 which shows, first, these two elements taken separately and assembled (upper view) and then the support (5) taken alone (lower view). It can be seen that the support (5) has the shape of a sort of stopper comprising a cap (14), a hollow inner cylindrical part (15) intended for receiving the rotation axle and fins (16) that have a substantially helical lateral surface. The edges of these fins define an outer cylindrical wall equipped with substantially helical recesses. This geometry gives the flow of urea inside the support (5), a sort of screw profile which makes it possible to accelerate it and by doing so increase the effectiveness of the pump.

The invention claimed is:

1. A supply system for a liquid comprising:
a liquid tank that includes a base plate;
a liquid supply line tube connected to the tank;
a rotary pump disposed within the tank, the rotary pump including a rotation axle attached to both a mechanical pumping element and a magnetized rotor;
a filter at least partly surrounding the pump;
a sealed enclosure including
a substantially cylindrical wall attached to the base plate, and
a second cover assembled in a sealed manner with the cylindrical wall atop the cylindrical wall, the filter resting atop the second cover, and the rotation axle of the pump being inserted in a sealed manner through the second cover; and
a common housing that includes a first cover having a shape that surrounds the filter and surrounds at least a portion of the pump and the mechanical pumping element of the rotary pump, the first cover surrounding the filter such that a gap exists between adjacent walls of the filter and the first cover, respectively, that allows the supply line tube, the pump, and the filter to be purged and, the shape of the first cover being a bell having at least one opening in a lower part thereof, the gap being an annular cavity between an inner surface of the first cover and outer surfaces of both the sealed enclosure and the filter, and the liquid being able to be sucked up through the at least one opening in the lower part of the first cover,
wherein the common housing is attached to the base plate.

2. The supply system according to claim 1, wherein the pump sucks up through the filter.

3. The supply system according to claim 1, further comprising a siphon part such that once the pump and the filter have been purged and filled with gas, the siphon part only allows liquid to flow from the tank to the supply line tube, the pump, and the filter when the pump is started up.

4. The supply system according to claim 1, wherein the rotor includes at least one recess through which the liquid sucked up by the mechanical pumping element is forced, and
wherein the filter surrounds at least the mechanical pumping element.

5. The supply system according to claim 4, wherein the rotary pump comprises a stator and electronic cards,
   wherein the common housing further includes a sealed enclosure which encloses the rotor, the stator, and the electronic cards,
   wherein the filter rests on the sealed enclosure, and
   wherein the first cover further surrounds the mechanical element and is attached via a screw and nut connection to the sealed enclosure.

6. The supply system according to claim 4, wherein the mechanical pumping element comprises at least two gears, and
   wherein purging occurs via reversing a rotational direction of the rotary pump.

7. A method for pollution control of nitrogen oxides (NOx) from vehicle exhaust gases, comprising:
   providing the supply system according to claim 1 in a selective catalytic reduction (SCR) system for selective catalytic reduction of the NOx in the exhaust gases of a vehicle using a eutectic water/urea solution.

8. The supply system according to claim 1, wherein the first cover extends coaxially with the filter.

9. The supply system according to claim 3, wherein the siphon part includes an opening between the housing and the base plate of the tank.

* * * * *